(12) United States Patent
Syvret et al.

(10) Patent No.: US 6,984,366 B2
(45) Date of Patent: Jan. 10, 2006

(54) METHOD FOR NITROGEN TRIFLUORIDE PRODUCTION

(75) Inventors: Robert George Syvret, Allentown, PA (US); Beth Ann Campion, Allentown, PA (US); Gregory Alan Cooper, Wernersville, PA (US); Joan Marie Schork, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 107 days.

(21) Appl. No.: 10/687,073

(22) Filed: Oct. 16, 2003

(65) Prior Publication Data

US 2004/0096387 A1   May 20, 2004

Related U.S. Application Data

(63) Continuation-in-part of application No. 10/299,482, filed on Nov. 19, 2002, now abandoned.

(51) Int. Cl.
*C01B 21/083*   (2006.01)
(52) U.S. Cl. .................................. 423/406; 423/483
(58) Field of Classification Search ................ 423/406, 423/483
See application file for complete search history.

(56) References Cited

U.S. PATENT DOCUMENTS

| 4,091,081 A | 5/1978 | Woytek et al. |
| 5,637,285 A | 6/1997 | Coronell et al. |
| 6,183,713 B1 | 2/2001 | Tokunaga et al. |

FOREIGN PATENT DOCUMENTS

| EP | 03170307 | 7/1991 |
| JP | 1307243 | 12/1989 |
| WO | WO 01/85603 A2 | 11/2001 |

OTHER PUBLICATIONS

European Seach Report 03026257.0-1218, dated Feb. 24, 2004.

*Primary Examiner*—Wayne A. Langel
(74) *Attorney, Agent, or Firm*—R. P. Morris-Oskanian

(57) ABSTRACT

A method for the production of nitrogen trifluoride from a fluorine reactant and an ammonium ion source that is dispersed within a liquid phase reaction mixture containing one or more perfluorocarbon fluids is disclosed herein. In one embodiment, the fluorine reactant is introduced to the reaction mixture at a temperature that ranges from 90° C. to 120° C. In this embodiment, the percentage yield of nitrogen trifluoride may be about 80% or greater.

31 Claims, No Drawings

METHOD FOR NITROGEN TRIFLUORIDE PRODUCTION

CROSS-REFERENCE TO RELATED APPLICATIONS

This application is a continuation-in-part of U.S. patent application Ser. No. 10/299,482, filed 19 Nov. 2002 now abandoned, the disclosure of which is incorporated herein by reference in its entirety.

BACKGROUND OF THE INVENTION

There is currently a large and growing requirement of nitrogen trifluoride ($NF_3$) for use in semiconductor manufacturing. Nitrogen trifluoride may be used, for example, as an etchant or chamber cleaning gas. On an industrial scale, $NF_3$ is typically manufactured by the fluorination of an ammonium bifluoride/HF complex. There are two principle methods for fluorination of this complex: direct fluorination (DF) and electrochemical fluorination (ECF).

In the direct fluorination of $NH_3$ or $NH_4^+$ salts to produce $NF_3$, there are competing reactions such as the following:

$$3 F_2 + NH_3 \rightarrow NF_3 + 3 HF \quad (1)$$

$$3 F_2 + 2 NH_3 \rightarrow N_2 + 6 HF \quad (2)$$

$$4 F_2 + 2 NH_3 \rightarrow N_2F_2 + 6 HF \quad (3)$$

The most favored reaction according to thermodynamic calculations is (2), which produces only undesirable $N_2$ and HF. The prior art has attempted to enhance reaction (1) to produce $NF_3$ and minimize the extent of reactions (2) and (3).

The prior art provides a variety of direct fluorination methods for the synthesis of nitrogen trifluoride. For example, U.S. Pat. No. 4,091,081 describes a direct fluorination method for manufacturing nitrogen trifluoride whereby gaseous $F_2$ is contacted with liquid (molten) ammonium acid fluoride (AAF) while gaseous $NH_3$ is separately contacted with the liquid AAF to generate ammonium ions. The '081 process typically provides $NF_3$ yields of 40–50%. It is operated to maintain a molar ratio of by-product HF to ammonia, referred to as the melt ratio, of 2.0 to 2.5 in the reaction liquid and at temperatures above the melting point of ammonium bifluoride, $NH_4HF_2$, which is 127° C. The contacting of $F_2$ with AAF is done using a specially designed sparger having a plurality of small holes.

U.S. Pat. No. 5,637,285 describes a DF method for production of nitrogen trifluoride by the fluorination of an ammonium acid fluoride, $NH_4H_{(x-1)}F_x$ where x is at least 2.55 and the melt ratio of HF to ammonia is at least 2.55. Unlike the '081 patent, the reaction is conducted in a stirred reactor. The '285 process generally produces higher $NF_3$ yields than the '081 process.

U.S. Pat. No. 6,183,713 describes a method for generating nitrogen trifluoride by the fluorination of a packed bed containing a particulate ammonium complex of a metal fluoride. The ammonium complex within the bed needs to be continuously replenished in order to sustain the reaction.

Published Application WO 01/85603 A2 describes a process for generating nitrogen trifluoride through the reaction of ammonia and fluorine in the gas phase. The reaction is performed at temperatures of 80° C. or less in the presence of a diluting gas such as nitrogen, helium, argon, hexafluoroethane, and octafluoropropane.

Japanese Patent Application No. 1-307243 describes a process for generating nitrogen trifluoride through the reaction of gaseous ammonia and gaseous fluorine wherein either gas is first dissolved in a perfluorocarbon fluid. The reaction occurs in a non-stirred column at a temperature that ranges from −30° C. to the boiling point of the solvent. The perfluorocarbon fluid acts as a heat sink because the reaction between the $NH_3$ and $F_2$ gases is highly exothermic.

The direct fluorination method, while commonly used, has several drawbacks. First, the utilization of fluorine delivered to the process is less than 100%. Consequently, a significant amount of the fluorine is not reacted and must be scrubbed. Fluorine, unfortunately, is expensive to produce and difficult to handle. Thus, a utilization of less than 100% of the fluorine within the process is economically disadvantageous. Second, the process of scrubbing unreacted fluorine generates unwanted toxic by-products such as $OF_2$. These by-products can be difficult to separate from $NF_3$ and create excess waste to be disposed. Third, the reaction medium may be highly corrosive to metal reactors and components at typical operating temperatures. Because of this, the reactors and components may eventually become contaminated by the dissolved metal ions within the reaction medium thereby leading to the disposal of the reaction medium. Lastly, the reaction between fluorine and ammonium ion may not be 100% selective to the formation of $NF_3$ and varying amounts of by-products, e.g., $N_2$ and $N_2F_2$, may be formed.

There is a need in the art for a nitrogen trifluoride production method that is more selective in the formation of nitrogen trifluoride rather than $N_2$ or $N_2F_2$. There is an additional need in the art for a method that reduces the corrosion of the metal reactors and related components during nitrogen trifluoride production. Further, there is a need in the art for a method that facilitates the removal of the HF by-product during the synthesis of nitrogen trifluoride. Yet another need in the art is a cost-effective method for nitrogen trifluoride production that increases the conversion of $F_2$.

All references cited herein are incorporated herein by reference in their entirety.

BRIEF SUMMARY OF THE INVENTION

A synthesis method for nitrogen trifluoride is disclosed herein. Specifically, in one aspect of the present invention, there is provided a method for producing a nitrogen trifluoride product comprising: providing a reaction mixture comprising an ammonium ion source and a perfluorocarbon fluid wherein at least a portion of the ammonium ion source comprises a solid and introducing a fluorine reactant to the reaction mixture for one or more temperatures sufficient to effect a reaction and thereby form the nitrogen trifluoride product.

In a further aspect, there is provided a method for producing a nitrogen trifluoride product comprising: combining an ammonium ion source and a perfluorocarbon fluid to form a reaction mixture wherein at least a portion of the ammonium ion source comprises a solid; heating the reaction mixture to substantially solubilize at least a portion of the ammonium ion source within the perfluorocarbon fluid; and introducing a fluorine reactant to the reaction mixture for one or more temperatures sufficient to effect a reaction and thereby form the nitrogen trifluoride product.

In another aspect, there is provided a method for producing a nitrogen trifluoride product at a high yield comprising: combining an ammonium ion source and a perfluorocarbon fluid to form a reaction mixture wherein at least a portion of the ammonium ion source comprises a solid; heating the reaction mixture to substantially solubilize at least a portion of the ammonium ion source within the perfluorocarbon fluid; and introducing a fluorine reactant to the reaction mixture for one or more temperatures ranging from about 90° C. to about 120° C. sufficient to effect a reaction and thereby form the nitrogen trifluoride product wherein the percentage yield of the nitrogen trifluoride product is about 80% or greater.

These and other aspects of the invention will become apparent from the following detailed description.

DETAILED DESCRIPTION OF THE INVENTION

A method of synthesizing nitrogen trifluoride is disclosed herein. In one aspect, the method involves contacting a fluorine reactant such as gaseous $F_2$ with an ammonium ion source that is dispersed within a liquid phase reaction mixture containing one or more perfluorocarbon ("PFC") fluids. The method of the present invention may allow for improved conversion of the fluorine reactant along with enhanced selectivity to the $NF_3$ reaction over the competing $N_2$ and $N_2F_2$ reactions thereby resulting in relatively higher yields of $NF_3$ not attainable heretofore. The improved conversion of the fluorine reactant may also lower production costs because less fluorine reactant is needed per unit of $NF_3$ produced and less fluorine and secondary products like $OF_2$ have to be scrubbed or removed. Further, the use of perfluorocarbon fluid within the reaction mixture may reduce corrosion of the metal reactors and ancillary components thereby avoiding disposal of the reaction mixture. Moreover, the HF by-product can be more readily removed from the PFC-containing reaction mixture than in previous methods of the art.

Although not intending to be bound by theory, it is believed that, in one embodiment of the present invention, the reaction between a fluorine reactant and one or more ammonium ion sources dispersed in a reaction mixture containing a perfluorocarbon fluid may form nitrogen trifluoride and HF. An example of the process chemistry for this embodiment is presented in equation (4).

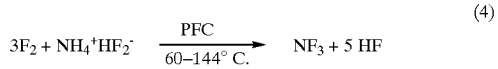

$$3F_2 + NH_4^+HF_2^- \xrightarrow[60-144° C.]{PFC} NF_3 + 5\ HF \quad (4)$$

It is believed that the perfluocarbon fluid may improve the reaction between the fluorine reactant and the ammonium ion source in a variety of ways. The PFC within the reaction mixture may at least partially solubilize the one or more ammonium ion sources contained therein. The fluorine reactant may also be more soluble in the reaction mixture thereby enhancing the reaction kinetics leading to higher conversion of the fluorine reactant to nitrogen trifluoride. An improvement in the reaction kinetics may lead to equivalent or higher reaction rates at lower temperatures than expected. Further, it is believed that the PFC provides a non-polar reaction mixture whereby radical processes are favored over ionic processes. In this connection, the lower solubility of metal ions within the PFC-containing reaction mixtures compared to neat reaction mixtures (i.e., melts containing HF and an ammonium ion source) reduces the corrosion of metallic reactors and components. Moreover, the HF is immiscible and less dense in the majority of PFC fluids thereby improving the removal of HF from a PFC-containing reaction mixture compared to a neat reaction mixture.

In the present invention, any ammonium ion source could be used such that it generates substantially a liquid within the reaction mixture at the operating range or have melting points within the operating range. Examples of suitable ammonium ion sources include, but are not limited to, $NH_4F$, $NH_4HF_2$, $NH_4Cl$, $NH_4Br$, $NH_4I$, $NH_4NO_3$, $(NH_4)_3PO_4$, $(NH_4)_2SO_4$, $(NH_4)_2CO_3$, $NH_4HCO_3$, $NH_4HSO_4$, $NH_4OSO_2F$, $NH_4OSO_2Cl$, $NH_4OSO_2CF_3$, $NH_4OSO_2CH_3$, $NH_4OC(O)CF_3$, $NH_4OC(O)CH_3$, $NH_4N(SO_2CF_3)_2$, $NH_4OIOF_4$, $NH_4OTeF_5$, or combinations thereof. In an alternative embodiment, at least one ammonium ion source may be ammonia gas or $NH_3$. In certain preferred embodiments of the present invention, the ammonium ion source may initially be a solid that is at least partially solubilized in the PFC-containing reaction mixture to which $NH_3$ is added thereto.

Further examples of ammonium ion sources include ammonium fluorometallate poly(hydrogen fluorides) that can result from the reaction of ammonium fluorometallates with a certain amount of HF sufficient to provide substantially a liquid under the reaction conditions or have melting points within the operating range. This general class of compounds can be described by the formula $(NH_4)_yM\text{-}F_z.nHF$, where M is one or more elements selected from Group 1 through 18 of the Periodic Table of the Elements; y is a number that ranges from 1 to 4; z is a number that ranges from 2 to 8; and n is an amount that is sufficient to maintain the compound as a liquid in the reaction mixture. This class of compounds may also be generated by the reaction between ammonium fluoride, HF, and one or more binary fluorides or, alternatively, through the reaction between ammonium poly(hydrogen fluoride) and metal fluorides. Examples of these compounds include the following: $(NH_4)_2(B_{12}F_{12})$, $NH_4BrF_6$, $NH_4IF_6$, $NH_4ClF_6$, $NH_4VF_6$, $NH_4RuF_7$, $(NH_4)_3FeF_6$, $(NH_4)_2SiF_6$, $(NH_4)_3AlF_6$, $NH_4SbF_6$, $NH_4AsF_6$, $NH_4BiF_6$, $NH_4Sb_2F_{11}$, $NH_4As_2F_{11}$, $NH_4Sb_3F_{16}$ or combinations thereof.

Still further examples of ammonium ion sources include compounds such that its combination with the proper amount of HF generates substantially a liquid within the reaction mixture at the operating range or have melting points within the operating range. These compounds can be described by the formula $(NH_4)_xM_yA.nHF$ wherein M is one or more elements selected from Group 1 through 18 of the Periodic Table of the Elements; A is an anion from the group consisting of carbonate, bicarbonate, phosphate, sulfate, nitrate, periodate, perbromate, or perchlorate; x is a number that ranges from 1 to 3; y is a number that ranges from 0 to 2; and n is an amount that is sufficient to maintain the compound as a liquid in the reaction mixture. Examples of these compounds include, but are not limited to, $NH_4NO_3$, $(NH_4)_3PO_4$, $(NH_4)_2SO_4$, $(NH_4)_2CO_3$, $NH_4HCO_3$, $NH_4HSO_4$, $NH_4IO_4$, $NH_4ClO_4$, and $NH_4BrO_4$.

Yet another example of an ammonium ion source may be the waste product or "spent" reaction medium resulting from production processes that would contain an ammonium ion source. For example, in a reaction between an ammonium ion source and a fluorine source to produce $NF_3$, the amount of HF present in the reaction medium may accumulate, slowing the reaction kinetics and eventually stopping the production of $NF_3$ unless excess ammonium ion is provided and reaction medium is purged from the reactor at a rate sufficient to maintain an acceptable melt ratio. The "spent" reaction medium, which contains ammonium ions, may be combined with one or more perfluorocarbon liquids and the resulting mixture can be used for the production of $NF_3$ at appropriate operating conditions.

In addition to the one or more ammonium ion sources, the reaction mixture further contains one or more perfluorcarbon fluids. The term "perfluorocarbon" or "perfluorinated" as used herein, are compounds in which a substantial majority of all of the bonding sites on the C backbone are occupied by fluorine atoms. Perfluorocarbon fluids may include those compounds containing a perfluorinated segment that is segregated by a fully hydrogenated segment or another perfluorinated segment by an oxygen or ether linkage. In addition, perfluorcarbon fluids may also include compounds wherein the perfluorinated compound contains one or more organo-functional or hydrogen end groups. Examples of suitable perfluorocarbon fluids include, but are not limited to, perfluoroalkanes (i.e., perfluoropropane, perfluorobutane, perfluorohexane, perfluoroheptane, or perfluoro-n-octane), perfluoroaryl (i.e., perfluorophenyl), perfluorocycloalkanes (i.e. 1,3-perfluorodimethylcyclohexane, 1,4-perfluorodimethylcyclohexane, or perfluoromethylcyclohexane), perfluoropolyethers (i.e., GALDEN®, FOMBLIN®, and FLUOROLINK® perfluorinated polyethers ("PFPE") manufactured by Solvay Solexis (formerly Ausimont). or KRYTOX® manufactured by DuPont, Inc.), or hydrofluoroethers ("HFPE").

The perfluorocarbon fluid preferably is non-volatile and non-reactive at the desired operating temperature range, i.e., from 60° C. to 144° C. to reduce the amount of fluid loss during $NF_3$ synthesis. As mentioned previously, the reaction mixture comprises one or more ammonium ion sources and one or more perfluorocarbon fluids to provide an ammonium poly(hydrogen fluoride) complex dispersed within the PFC fluid. The reaction mixture may be heated to one or more temperatures that range from 60° C. to 144° C., preferably from 96° C. to 120° C., and more preferably from 96° C. to 114° C. to substantially solubilize at least a portion of the ammonium ion source within the perfluorocarbon fluid. In some embodiments, the weight-to-volume ratio of the ammonium ion source to the perfluorocarbon fluid may range from 4:1 to 1:2, preferably 1:1, and more preferably 1:2. In some embodiments, the melt ratio, or the ratio of HF to $NH_3$ in the reaction mixture, may range from 5 to 1, preferably from 3 to 1, and more preferably from 2 to 1.

In alternative embodiments, the amount of the ammonium ion source to the perfluorocarbon fluid expressed in weight percent of the reaction mixture may range from 1% of ammonium ion source to 99% perfluorocarbon fluid to 99% of ammonium ion source to 1% perfluorocarbon fluid. In these embodiments, the concentration of fluorine reactant that is introduced into the reaction mixture may range from 1 to 100 by volume percent.

In certain embodiments of the present invention, the nitrogen trifluoride synthesis is conducted in a reaction vessel containing a reaction mixture. Some non-limiting examples of suitable reaction vessels include stirred tanks, gas-lift reactors, venturi-loop reactors, gas/liquid cyclone and centrifuge reactors, spray tower and spray cyclone reactors, falling film reactors, packed column reactors, in-line static-mixer reactors, or a bubble column.

A fluorine reactant is introduced into the reaction mixture to react with the ammonium poly(hydrogen fluoride) complex and form nitrogen trifluoride. The concentration of fluorine within the fluorine reactant may range from 1% to 100%, preferably from 80% to 100%, and more preferably 100% by volume fluorine. The fluorine reactant may contain, for example, nitrogen and/or one or more inert gases.

The fluorine reactant can be introduced into the reaction mixture in a variety of ways such as, for example, a sparger and/or inlet port or into the headspace providing that a gas entrainment impeller is used or, alternatively, some other device provided to get the reactant gas from the headspace into the reaction medium. In certain embodiments, such as commercial production processes, the rate of introduction of fluorine reactant may range from 20 lbs per hour of $F_2$ or greater, preferably 30 lbs per hour of $F_2$ or greater, and more preferably 40 lbs per hour of $F_2$ or greater. In these embodiments, it is desirable that the flow of fluorine reactant into the reaction vessel continue until at least steady state is achieved. It is anticipated that conducting the reaction with a relatively small headpressure or back pressure on the reactor may increase the $F_2$ conversion and hence, the $NF_3$ yield.

The process can be operated continuously and the optimum yield of $NF_3$ (highest fluorine conversion and $NF_3$ selectivity) can be maintained by keeping the system at the optimum "steady-state" ammonium concentration by periodic or continuous addition of an ammonium ion source such as $NH_3$ gas to the reaction mixture. The concentration of ammonia may range from 1% to 100%, preferably from 80% to 100%, and more preferably 100% by weight ammonia. The ammonia may contain, for example, nitrogen and/or one or more inert gases. Like the fluorine reactant, the ammonia gas may be introduced through a sparger and/or inlet port or other means into the reaction medium or directly into the headspace providing that a gas entrainment impeller is used to pull the headspace gas into the liquid phase.

In certain embodiments, such as commercial production processes, the rate of introduction of ammonia reactant may range from 3 lbs per hour of $NH_3$ or greater, preferably 4.5 lbs per hour of $NH_3$ or greater, and more preferably 6 lbs per hour of $NH_3$ or greater depending on the optimum ammonium ion concentration desired in the PFC phase to get the optimum $NF_3$ yield. In these embodiments, it is desirable that the flow of ammonia into the reaction vessel continue until at least steady state is achieved or the conditions of highest $NF_3$ yield are attained. The introduction of ammonia into the reaction mixture is preferably conducted at the same time as the introduction of the fluorine reactant in order to allow for a continuous process. Further, ammonia may also be introduced at the end of a reaction in order to adjust the ammonium ion concentration that corresponds to the highest $NF_3$ yield.

The reaction mixture may be agitated to enhance the contact between the fluorine reactant and the ammonium poly(hydrogen fluoride) complex. Agitation may be achieved, for example, by boiling the reaction mixture, ultrasonic energy, or mechanical agitation. In embodiments wherein the mixture is mechanically agitated, the reaction vessel may be equipped with a stirrer, turbine, or gas entrainment impeller. In the present invention for reactors equipped with a gas entrainment impeller, the extent of agitation is at or above a speed of 1,000 revolutions per minute (rpm), preferably at or above 1,500 rpm, most preferably at or above 1,800 rpm. At commercial scale, agitation is best defined by agitation power input. In this case, the desired agitation power is ideally in the range of 1,000 W/m$^3$ to 50,000 W/m$^3$. Alternatively, the reaction mixture may be mechanically agitated via a bubble column. Alternatively, the reaction mixture may be recirculated, for instance using an external pumping system, to faciliate mixing.

The invention will be illustrated in more detail with reference to the following examples, but it should be understood that the present invention is not deemed to be limited thereto. For the following examples, gas chromatography (GC), FT-IR spectroscopy, and UV spectroscopy were used to analyze the gas-phase products to determine the $F_2$ conversion, product selectivities, and yields. GC analyses were carried out on a HP-6890 gas chromatograph equipped with dual injectors, columns, and TCD detectors. The columns employed were a Porapak-Q (10', 80/100 mesh) and a Mole Sieve 5-A (2 m, 80/100 mesh). Table I provides a summary of the various reaction parameters for each example. Table II provides the results of GC product analysis for each of the examples.

In all of the examples, the analytical method involved first the removal of the condensable species such as gaseous HF from the product stream by complexation with NaF or by liquefaction in a cold (approximately −80° C.) trap, followed by online analysis by FT-IR spectroscopy and UV spectroscopy, and then followed by the stoichiometric conversion of any unreacted $F_2$ to 0.5 equivalents of $O_2$ by reaction with high surface area, activated alumina as described in equation (5):

$$3\ F_2 + Al_2O_3 \rightarrow 1.5\ O_2 + 2\ AlF_3 \tag{5}$$

The remaining mixture of $NF_3$, $N_2$, $O_2$, $N_2F_2$, and $N_2O$ was analyzed through standard GC methods. Using the GC data, the % yield of $NF_3$ was calculated as follows: [1 mole of $NF_3$ produced/3 moles of $F_2$ fed]100. The % selectivity to $NF_3$ was calculated as follows: [1 mole of $NF_3$ produced/3 moles of $F_2$ reacted]100 and the % $F_2$ conversion was calculated as follows: [moles of $F_2$ reacted/moles of $F_2$ fed]100. The moles of $F_2$ fed and reacted are calculated using the mole-% concentrations from the GC analysis, and verified by comparison with data from the online UV and FT-IR instruments, of all the products in the reactor exhaust stream (after HF removal) along with the stoichiometric requirements of the $F_2$ reactions needed to produce these concentrations of products. The $NF_3$ yield is determined by gas chromatographic analysis and is based on the total amount of $F_2$ fed to the reactor and the conversion is based on the amount of unreacted $F_2$ measured in the exit stream from the reactor.

EXAMPLES

Example 1

Fluorination of Ammonium Bifluoride in Fomblin® 25/6 PFC Solvent at 96° C.

A 300-cc Monel® reactor vessel manufactured by Parr Instrument Co. of Moline, Ill. was charged with seventy-five grams (1.32 m) of solid ammonium bifluoride ($NH_4^+HF_2^-$), referred to herein as ABF and approximately 150 mL (286 g) of Fomblin® 25/6 oil to provide a reaction mixture. The reactor was fitted with a cooling coil or baffles, thermocouple probe, $F_2$ inlet tube into the liquid, $NH_3$ inlet tube into the liquid, pressure gauge, exhaust port and gas entrainment impeller type stirrer. The mixture was stirred at a speed greater than 1900 revolutions per minute (rpm) while being heated externally to the operating temperature of approximately 96° C. Once the operating temperature was reached, a 100% concentration of fluorine gas was passed into the mixture through an inlet tube at the rate of 50 standard cubic centimeters per minute (sccm), or approximately 2.2 mmol/min, and the product was directed out of the reactor through the exhaust port.

Upon exiting the exhaust port, the product gas was passed through a low-temperature U-tube cooled externally to approximately −78° C. to remove HF. The product gas was then passed through a bed of pellitized sodium fluoride to remove any residual HF, through the gas-cell of an on-line infrared spectrometer to measure infrared active product species continuously in real-time, through a second gas cell fitted with a UV spectrometer (to measure UV active product species continuously in real-time), through the bed of activated $Al_2O_3$ (which quantitatively converts each mol of $F_2$ to ½ $O_2$), through the gas-sampling loop of a gas chromatograph (GC), and finally vented to the atmosphere.

Fluorine was added continuously to the reactor for approximately 340 minutes and the composition of the product gas exiting the reactor was measured approximately every 20 minutes. After the first 200 minutes of reaction time, the concentration of fluorine, $NF_3$, $N_2$, and $N_2O$ exiting the reactor had reached a "steady-state" concentration. At "steady-state" conditions, the fluorine conversion (expressed as a percentage and calculated as 100 minus the amount of fluorine measured in the exit stream) was 99.5%. The normalized product gas composition was 94.2% $NF_3$, 2.4% $N_2$, and 3.4% $N_2O$. The $NF_3$ yield (expressed as the product of the fluorine conversion and the normalized selectivity to $NF_3$) was (99.5) (94.2) or 93.7%.

Example 2

Fluorination of Ammonium Bifluoride in Fomblin® 25/6 PFC Solvent at 96° C.—High $F_2$ Nitrogen trifluoride was prepared as described in Example 1 except that 75.4 grams (1.32 mol) solid ABF and approximately 150 mL (289 g) of Fomblin® 25/6 oil were combined in the Monel stirred reactor. Once at the operating temperature, $F_2$ (100% concentration) was delivered to the stirred mixture by way of a dip tube at the rate of 73.3 sccm and the product gas was directed out of the reactor through an opening in the headspace. Upon exiting the reactor, the product gas was handled and analyzed as described in Example 1. Fluorine was added continuously for approximately 260 minutes and the composition of the product gas exiting the reactor was measured approximately every 20 minutes. After the first 180 minutes of reaction time, the concentration of fluorine, $NF_3$, $N_2$, and $N_2O$ exiting the reactor had reached a "steady-state" concentration. At "steady-state" concentration, the fluorine conversion was 96%. The normalized product gas composition was 94% $NF_3$, 2% $N_2$, and 4% $N_2O$. The $NF_3$ yield was 90%.

When compared with Example 1, the $NF_3$ yield was not improved by increasing the $F_2$ flow rate.

Comparative Example A

Fluorination of Neat ABF Melt (2.5 melt ratio) at 96° C.

This experiment was conducted as described in Example 1 except that an ABF/HF melt (melt ratio of 2.50), approximately 150 mL in volume and weighing 303 g (4.5 mol $NH_3$), was transferred to the Monel stirred reactor. The mixture was heated externally to the operating temperature of 96–97° C. Once at the operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. Fluorine was added continuously for approximately 360 minutes and the composition of the product gas exiting the reactor was measured approximately every 20 minutes. After the first 320 minutes of reaction time, the concentration of fluorine, $NF_3$, $N_2$, and $N_2O$ exiting the reactor had reached a "steady-state" concentration. At "steady-state" concentration, the fluorine conversion was 62%. The normalized product gas composition was 96% $NF_3$, 0% $N_2$, and 4% $N_2O$. The $NF_3$ yield was 60%.

In comparison with Example 1, reaction mixtures containing PFC fluid in addition to ABF in the liquid phase result in higher $NF_3$ yields than reaction mixtures containing ABF and HF, or "neat" reaction mixtures.

Comparative Example B

Fluorination of Neat ABF Melt (3.11 melt ratio) at 96° C.

This experiment was conducted as described in Example 1 except that an ABF/HF melt (melt ratio of 3.11), approximately 200 mL in volume and weighing 279 g (3.5 mol $NH_3$), was transferred to the Monel stirred reactor. The mixture was stirred at >1900 rpm and heated externally to the operating temperature of 96–97° C. Once at the operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" concentration, the fluorine conversion was 50%. The normalized product gas composition was 80% $NF_3$, 18% $N_2$, and 2% $N_2O$. The $NF_3$ yield was 40%.

In comparison with Example 1, reaction mixtures containing PFC fluid in addition to ABF in liquid phase result in a higher $NF_3$ yield than neat reaction mixtures. In comparison with Comp. Ex. A, the higher melt ratio resulted in a lower $NF_3$ yield.

Comparative Example C

Fluorination of Ammonium Tetrafluoroborate in Fomblin® 25/6 PFC Solvent at 96° C.

This experiment was conducted as described in Example 1 except that 91.4 grams (0.87 mol) ammonium tetrafluoroborate, $NH_4^+BF_4^-$ and approximately 100 mL (197 g) of Fomblin® 25/6 oil were combined in the Monel stirred reactor. The mixture heated externally to the operating temperature of 96–97° C. Once at operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" fluorine conversion was 1%. The normalized product gas composition was 0% $NF_3$, 0% $N_2$, and 100% $N_2O$. The $NF_3$ yield was 0%.

The present example illustrates that not all ammonium ion sources can react with the fluorine reactant to produce $NF_3$.

Example 3

Fluorination of Ammonium Bifluoride in Fomblin® 25/6 PFC Solvent at 115° C.

This experiment was conducted as described in Example 1 except that 100.2 grams (1.76 mol) solid ABF and approximately 200 mL (364 g) of Fomblin® 25/6 oil were combined in the Monel stirred reactor. The mixture was heated externally to the operating temperature of 114–115° C. Once at the operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" fluorine conversion was 98%. The normalized product gas composition was 94% $NF_3$, 5% $N_2$, and 1% $N_2O$. The $NF_3$ yield was 92%.

When compared with Example 1, the $NF_3$ yield decreased slightly when the operating temperature was increased.

Comparative Example D

Fluorination of Neat ABF Melt (3.06 Melt Ratio) at 114° C.

This experiment was conducted as described in Example 1 except that an ABF/HF melt (melt ratio of 3.06), approximately 200 mL in volume and weighing 272 g (3.5 mol $NH_3$) was transferred to the Monel stirred reactor. The mixture was heated externally to the operating temperature of 114° C. Once at the operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" fluorine conversion was 80%. The normalized product gas composition was 88% $NF_3$, 5% $N_2$, and 7% $N_2O$. The $NF_3$ yield was 70%.

In comparison with Example 3, reaction mixtures containing PFC fluid in addition to ABF in the liquid phase result in a higher $NF_3$ yield than neat ABF reaction mixtures.

Example 4

Fluorination of Ammonium Bifluoride in Fomblin® 25/6 PFC Solvent at 144° C.

This experiment was conducted as described in Example 1 except that 100.2 grams (1.76 mol) solid ABF and approximately 150 mL (282 g) of Fomblin® 25/6 oil were combined in the Monel stirred reactor. The mixture was heated externally to the operating temperature of 144° C. Once at the operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" concentration, the fluorine conversion was 90%. The normalized product gas composition was 99% $NF_3$, 0% $N_2$, and 1% $N_2O$. The $NF_3$ yield was 89%.

When compared with Examples 1 and 3, the $NF_3$ yield decreased when the operating temperature was increased.

Example 5

Fluorination of Ammonium Bifluoride in APF-240 PFC Solvent at 144° C.

This experiment was conducted as described in Example 1 except that 101.8 grams (1.79 mol) solid ABF and approximately 150 mL (305 g) of APF-240 (Air Products 240° C. boiling point) oil were combined in the Monel stirred reactor. The mixture was heated externally to the operating temperature of 144° C. Once at operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. Steady-state was not achieved in this experiment. An "optimum" fluorine conversion was reached at >99%. The normalized product gas composition was 81% $NF_3$, 18% $N_2$, and 1% $N_2O$. The $NF_3$ yield was 80%.

Example 6

Fluorination of Ammonium Fluoride in Fomblin® 25/6 PFC Solvent at 144° C.

This experiment was conducted as described in Example 1 except that 65.1 grams (1.76 mol) solid AF, $NH_4^+F^-$ and approximately 200 mL (376 g) of Fomblin® 25/6 oil were combined in the Monel stirred reactor. The mixture was heated externally to the operating temperature of 144° C. Once at operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" fluorine conversion was 87%. The normalized product gas composition was 98% $NF_3$, 1% $N_2$, and 1% $N_2O$. The $NF_3$ yield was 85%.

This example illustrates that alternative ammonium ion sources can be used in the present invention other than ABF.

Comparative Example E

Fluorination of Neat ABF Melt (3.08 melt ratio) at 144° C.

This experiment was conducted as described in Example 1 except that an ABF/HF melt (melt ratio of 3.08), approximately 200 mL in volume and weighing 267 g (3.4 mol $NH_3$) was transferred to the Monel stirred reactor. The mixture was heated externally to the operating temperature of 144° C. Once at operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" fluorine conversion was 73%. The normalized product gas composition was 95% $NF_3$, 4% $N_2$, and 1% $N_2O$. The $NF_3$ yield was 69%.

In comparison with Example 4, reaction mixtures containing PFC fluid in addition to ABF in the liquid phase result in a higher $NF_3$ yield than neat ABF reaction mixtures.

Comparative Example F

Fluorination of Ammonium Tetrafluoroborate in APF-240 PFC Solvent at 144° C.

This experiment was conducted as described in Example 1 except that 51.2 grams (0.49 mol) ammonium tetrafluoroborate, $NH_4^+BF_4^-$ and approximately 150 mL (288 g) of APF-240 (Air Products 240° C. boiling point) oil were combined in the Monel stirred reactor equipped. The mixture was heated externally to the operating temperature of 144° C. Once at operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state", the fluorine conversion was 2%. The normalized product gas composition was 86% $NF_3$, 0% $N_2$, and 14% $N_2O$. The $NF_3$ yield was 2%.

This example demonstrates that changing the PFC liquid to APF-240 from FOMBLIN 25/6 may allow for the production of some $NF_3$ in the product gas stream (see Comp Ex C). However, the $NF_3$ yield is still minimal.

Example 7

Fluorination of Ammonium Bifluoride in Fomblin® 25/6 PFC Solvent at 60° C.

This experiment was conducted as described in Example 1 except that 75.5 grams (1.32 mol) solid ABF and approximately 150 mL (287 g) of Fomblin® 25/6 oil were combined in the Monel stirred reactor and heated externally to the operating temperature of 60° C. Once at the operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state", the fluorine conversion was 15%. The normalized product gas composition was 93% $NF_3$, 0% $N_2$, and 7% $N_2O$. The $NF_3$ yield was 14%.

The present reaction demonstrates that the $NF_3$ yield decreases at lower temperatures compared to Example 1.

Comparative Example G

Fluorination of Neat ABF Melt (3.98 Melt Ratio) at 60° C.

This experiment was conducted as described in Example 1 except that an ABF/HF melt (melt ratio of 3.98), approximately 200 mL in volume and weighing 269 g (2.8 mol $NH_3$) was transferred to the Monel stirred reactor. The mixture was heated externally to the operating temperature of 60° C. Once at operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" fluorine conversion was 4%. The normalized product gas composition was 60% $NF_3$, 23% $N_2$, and 17% $N_2O$. The $NF_3$ yield was 2%.

Compared to Example 7, the present example demonstrates that neat melts will have a relatively lower $NF_3$ yield compared to PFC-containing reaction mixtures at a temperature of 60° C.

Comparative Example H

Attempted Fluorination of Neat ABF Melt (2.50 Melt Ratio) at 60° C.

The method described in Example 1 was attempted for this experiment except that an ABF/HF melt (melt ratio of 2.50), approximately 150 mL in volume and weighing 312 g (4.7 mol $NH_3$), was transferred to the Monel stirred reactor. The mixture was heated externally to the operating temperature of 60° C. Once at operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. The addition of $F_2$ was only possible for 70 minutes since the dip-tube through which $F_2$ was added continued to plug. After numerous corrective attempts, the experiment was terminated and this experiment set of conditions was deemed unachievable. A "steady-state" fluorine conversion was never attained. When the experiment was terminated, there was no $NF_3$ being observed in the product gas exit stream.

This experiment demonstrated that neat melts having a lower melt ratio compared to Comp Ex G will not produce any $NF_3$ at a temperature 60° C. Unlike Example 7 in which the selectivity to $NF_3$ is 93%, the present example illustrates that PFC is a much better reaction medium that a neat ABF melt.

Example 8

Fluorination of Ammonium Bifluoride in Galden® HT-270 PFC Solvent at 96° C.

This experiment was conducted as described in Example 1 except that 75.5 grams (1.32 mol) solid ABF and approximately 150 mL (278.6 g) of Galden® HT-270 oil were combined in the Monel stirred reactor. The mixture was heated externally to the operating temperature of 96° C. Once at operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" fluorine conversion was 94.8%. The normalized product gas composition was 98.0% $NF_3$, 1.0% $N_2$, and 1.0% $N_2O$. The $NF_3$ yield was 93%. After 6 hours of $F_2$ addition time, the gas addition was stopped and the heat to the reactor was shut off. The next morning, the reactor and contents were again heated to 96° C. and the addition of $F_2$ was resumed. In this case, $F_2$ conversion peaked around 93% before declining steadily over the course of the reaction. Despite the decline in $F_2$ conversion, the product gas composition throughout the experiment containded at least 93% $NF_3$ and most often >97% $NF_3$.

This example demonstrates the effectiveness of the PFC solvent in maintaining the selectivity of the fluorination reaction to give the desired product, $NF_3$, nearly exclusively.

Example 9

Fluorination of Ammonium Bifluoride in Krytox® GPL-106 PFC Solvent at 96° C.

This experiment was conducted as described in Example 1 except that 75.3 grams (1.32 mol) solid ABF and approximately 150 mL (287.5 g) of Krytox® GPL-106 oil were combined in the Monel stirred reactor and heated externally to the operating temperature of 96° C. Once at operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" fluorine conversion was 91%. The normalized product gas composition was 99.5% $NF_3$, 0% $N_2$, and 0.5% $N_2O$. The $NF_3$ yield was 91%.

Example 10

Fluorination of Ammonium Bifluoride in Krytox® GPL-107 PFC Solvent at 96° C.

This experiment was conducted as described in Example 1 except that 75.4 grams (1.32 mol) solid ABF and approximately 150 mL (290.2 g) of Krytox® GPL-107 oil were combined in the Monel stirred reactor and heated externally to the operating temperature of 96° C. Once at operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" fluorine conversion was 89%. The normalized product gas composition was 99.5% $NF_3$, 0% $N_2$, and 0.5% $N_2O$. The $NF_3$ yield was 89%.

Compared to Example 9, the difference in viscosity of the two PFC oils does not provide a difference in their effectiveness as solvents for the method of the present invention.

Comparative Example I

Attempted Fluorination of Ammonium Bifluoride in FC-75 PFC Solvent at 144° C.

The method described in Example 1 was attempted for this experiment. Solid ABF, 100.1 grams (1.76 mol), and approximately 200 mL (386 g) of 3M Company PFC oil Fluoroinert FC-75 were combined in the Monel stirred reactor to provide a reaction mixture. The mixture was heated externally to the operating temperature of 144° C. Once at operating temperature, $F_2$ (100% concentration) was delivered to the stirred mixture by way of a dip tube at the rate of 50 sccm and the product gas was directed out of the reactor through an opening in the headspace. Immediately upon commencing the addition of $F_2$, there was a pressure increase in the reactor that indicated a plugging problem at the exit port. After numerous corrective attempts, it was impossible to maintain $F_2$ flow through the reactor. At this point the experiment was terminated and the reactor opened revealing a solid mass with very little liquid-phase remaining. Apparently, the combination of ABF, $F_2$, and FC-75 oil at 144° C. leads to the formation of a solid mass through which it is impossible to flow gas. This experimental set of conditions was deemed unachievable.

The experiment demonstrated that certain perfluorocarbon fluids may react with the ammonium ion source to form a precipitate rather than $NF_3$. In addition, it shows that contrary to what one trained in the art would expect, not all perfluorocarbons are effective (or inert) as solvents in this reaction.

Example 11

Fluorination of Ammonium Bifluoride in Fomblin® 25/6 PFC Solvent at 96 and 144° C. with Ammonia Addition This experiment was conducted as described in Example 1 except that 75.6 grams (1.33 mol) solid ABF and approximately 150 mL (281 g) of Fomblin® 25/6 oil were combined in the Monel stirred reactor. The mixture was heated externally to the operating temperature of 96° C. Once at operating temperature, $F_2$ (100% concentration) was delivered to the stirred mixture by way of a dip tube at the rate of 50 sccm and the product gas was directed out of the reactor through an opening in the headspace. Upon exiting the reactor, the product gas was handled and analyzed as described in Example 1. At "steady-state" fluorine conversion was 92%. The normalized product gas composition was >99% $NF_3$, 0% $N_2$, and <1% $N_2O$. The $NF_3$ yield was 91%.

The experiment was run for 5 hours before being shut down for the day. The heat was shut off and the $F_2$ feed was terminated. The next day, the experiment was resumed at the conditions that it was terminated. Within 60 minutes, the experiment had reached a steady-state fluorine conversion of 87%. At this point, a mixture of $He/NH_3$ was delivered to the reaction mixture at the rate of 14 sccm (0.6 mmol/min) $NH_3$ and was continued for 20 minutes. During this time, the steady-state conversion and selectivity values were maintained. The experiment was then shut down for the day. The heat was shut off and the $F_2$ and $NH_3$ feeds were terminated. The next day, the reactor and contents were heated to 144° C. before $F_2$ addition was resumed. Fluorine addition was continued for 150 minutes during which time the $F_2$ conversion continued to decrease, consistent with the decreasing ammonium ion concentration. After 150 minutes of $F_2$ addition, the $F_2$ conversion had reached a new steady-state of 49–52%, and the selectivities of the product gas were 92–97% $NF_3$, 0% $N_2$, and remainder $N_2O$. At this point, neat $NH_3$ was added at 14 sccm (0.6 mmol/min) and was continued for 60 minutes. During the addition of $NH_3$, the $F_2$ conversion values increased steadily from 49% to 89%. When the $F_2$ conversion had reached 89%, the $NH_3$ addition was terminated. The experiment was continued for an additional 100 minutes, during which time the $F_2$ conversion was maintained at a steady-state value of 89%. During the entire experiment, including $NH_3$ addition time, the selectivity to $NF_3$ was maintained at >99.5%. The steady-state yield of $NF_3$ was therefore 89%, even during the $NH_3$ addition stage.

Example 12

Fluorination of Ammonium Bifluoride in Fomblin® 25/6 PFC Solvent at 96° C. at Higher ABF Loading and Higher $F_2$ Addition Rate This experiment was conducted as described in Example 1 except that 100.1 grams (1.76 mol) solid ABF and approximately 100 mL (190 g) of Fomblin® 25/6 oil were combined in the Monel stirred reactor and heated externally to the operating temperature of 96° C. Once at the operating temperature, $F_2$ (100% concentration) was delivered to the stirred mixture by way of a dip tube at the rate of 75 sccm and the product gas was directed out of the reactor through an opening in the headspace. Upon exiting the reactor, the product gas was handled and analyzed as described in Example 1. At "steady-state", the fluorine conversion was 90%. The normalized product gas composition was 98.7% $NF_3$, 0.6% $N_2$, and 0.7% $N_2O$. The $NF_3$ yield was 89%. The present reaction demonstrates that by using a higher ABF loading (in this example 1:1 weight:volume) and a higher rate of $F_2$ addition, the $NF_3$ yield is still quite good.

Example 13

Fluorination of Ammonium Bifluoride in Fomblin® 25/6 PFC Solvent at 96° C. with Ammonia Addition Added Post-Reaction This experiment was conducted as described in Example 1 except that 75.2 grams (1.32 mol) solid ABF and approximately 150 mL (291 g) of Fomblin® 25/6 oil were combined in the Monel stirred reactor. The mixture was heated externally to the operating temperature of 96° C. Once at operating temperature, $F_2$ (100% concentration) was delivered to the stirred mixture by way of a dip tube at the rate of 75 sccm for the first 4 hours and then at 50 sccm for the remainder of the experiment. During the experiment, the product gas was directed out of the reactor through an opening in the headspace. Upon exiting the reactor, the product gas was handled and analyzed as described in Example 1. At "steady-state" fluorine conversion was 91%. The normalized product gas composition was 98.5% $NF_3$, 1.2% $N_2$, and 0.3% $N_2O$. The $NF_3$ yield was 90%.

The experiment was run for 6 hours before being shut down for the weekend. The heat was shut off and the $F_2$ feed was terminated. The following Monday, a predetermined amount of neat $NH_3$ gas (273 mmol) was introduced into the headspace of the reactor and mixed with the reaction medium by stirring for 30 minutes at 1857 rpm. Following the specified time, the mixture was heated to 96° C. and $F_2$ addition resumed at 50 sccm. to the reaction medium through the experiment was resumed at the conditions that it was terminated. Within 175 minutes, the experiment had reached a steady-state fluorine conversion of 92% and the selectivities of the product gas were 96–98% $NF_3$, 1–2% $N_2$, and remainder $N_2O$. The steady-state yield of $NF_3$ was therefore about 90%.

This example demonstrates that ammonia can be added post-reaction to adjust the ammonium ion concentration to a level such that $NF_3$ yield is maximized.

TABLE I

| | | | Reaction Conditions | | | |
|---|---|---|---|---|---|---|
| EX | $NH_4$ ION SOURCE (grams) | PFC (grams) | MELT RATIO | $F_2$ FLOW RATE | TEMP | $NH_3$ FLOW RATE |
| 1 | ABF (75.0 g) | FOMBLIN 25/6 (286 g) | N/A | 50 sccm | 96° C. | N/A |
| 2 | ABF (75.4 g) | FOMBLIN 25/6 (289 g) | N/A | 73.3 sccm | 96° C. | N/A |
| COMP. A | ABF · 0.5 HF melt | N/A | 2.5 | 50 sccm | 96° C. | N/A |
| COMP. B | ABF · 1.11 HF melt | N/A | 3.11 | 50 sccm | 96° C. | N/A |

TABLE I-continued

Reaction Conditions

| EX | NH$_4$ ION SOURCE (grams) | PFC (grams) | MELT RATIO | F$_2$ FLOW RATE | TEMP | NH$_3$ FLOW RATE |
|---|---|---|---|---|---|---|
| COMP. C | NH$_4$ + BF$_4$− (9.4 g) | FOMBLIN 25/6 (197 g) | N/A | 50 sccm | 96° C. | N/A |
| COMP. D | ABF · 1.06 HF melt | N/A | 3.06 | 50 sccm | 114° C. | N/A |
| EX 3 | ABF (100.2 g) | FOMBLIN 25/6 (364 g) | N/A | 50 sccm | 115° C. | N/A |
| EX 4 | ABF (100.2) | FOMBLIN 25/6 (282 g) | N/A | 50 sccm | 144° C. | N/A |
| EX 5 | ABF (101.8) | APF-240 | N/A | 50 sccm | 144° C. | N/A |
| EX 6 | AF (65.1 g) | FOMBLIN 25/6 (376 g) | N/A | 50 sccm | 144° C. | N/A |
| COMP. E | ABF · 1.08 HF melt | N/A | 3.08 | 50 sccm | 144° C. | N/A |
| COMP. F | NH$_4$ + BF$_4$− (51.2 g) | APF-240 (305 g) | N/A | 50 sccm | 144° C. | N/A |
| 7 | ABF (75.5 g) | FOMBLIN 25/6 (287 g) | N/A | 50 sccm | 60° C. | N/A |
| 8 | ABF (75.4 g) | GALDEN (278.6 g) | N/A | 50 sccm | 96° C. | N/A |
| 9 | ABF (75.3 g) | KRYTOX GPL-106 (287.5 g) | N/A | 50 sccm | 96° C. | N/A |
| 10 | ABF (75.4) | KRYTOX GPL-107 (290.2 g) | N/A | 50 sccm | 96° C. | N/A |
| COMP. G | ABF · 1.98 HF melt | N/A | 3.98 | 50 sccm | 60° C. | N/A |
| COMP. H | ABF · 0.5 HF melt | N/A | 2.5 | 50 sccm | 60° C. | N/A |
| COMP. I | ABF | FC-75 (386 g) | N/A | 50 sccm | 144° C. | N/A |
| 11 | ABF (75.6 g) | FOMBLIN 25/6 (281 g) | N/A | 50 sccm | 96° C. | 16.7 sccm |
| 12 | ABF (100.1 g) | FOMBLIN 25/6 (190 g) | N/A | 75 sccm | 96° C. | N/A |
| 13 | ABF (75.2 g) | FOMBLIN 25/6 (291 g) | N/A | 75/50 sccm | 96° C. | 273 mmol neat added |

TABLE II

Product Information and Yield

| EX | STEADY STATE (S.S.) F$_2$ CONVERSION | PRODUCT GAS COMPOSITION | NF$_3$ YIELD |
|---|---|---|---|
| 1 | 99.5% (200 min.) | 94.2% NF$_3$; 2.4% N$_2$; 3.4% N$_2$O | 93.75% |
| 2 | 96% (180 min.) | 94% NF$_3$; 2% N$_2$; 4% N$_2$O | 90% |
| COMP. A | 62% (320 min.) | 96% NF$_3$; 0% N$_2$; 4% N$_2$O | 60% |
| COMP. B | 50% | 80% NF$_3$; 18% N$_2$; 2% N$_2$O | 40% |
| COMP. C | 1% | 0% NF$_3$; 0% N$_2$; 100% N$_2$O | 0% |
| COMP. D | 80% | 88% NF$_3$; 5% N$_2$; 7% N$_2$O | 70% |
| 3 | 98% | 94% NF$_3$; 5% N$_2$; 1% N$_2$O | 92% |
| 4 | 90% | 99% NF$_3$; 0% N$_2$; 1% N$_2$O | 89% |
| 5 | S.S. not achieved; >99% conversion | 81% NF$_3$; 18% N$_2$; 1% N$_2$O | 80% |
| 6 | 87% | 98% NF$_3$; 1% N$_2$; 1% N$_2$O | 85% |
| COMP. E | 73% | 95% NF$_3$; 4% N$_2$; 1% N$_2$O | 69% |
| COMP. F | 2% | 80% NF$_3$; 0% N$_2$; 14% N$_2$O | 2% |
| 7 | 15% | 93% NF$_3$; 0% N$_2$; 7% N$_2$O | 14% |
| 8 | 94.8% | 98% NF$_3$; 1% N$_2$; 1% N$_2$O | 93% |
| 9 | 91% | 99.5% NF$_3$; 0% N$_2$; 0.5% N$_2$O | 91% |
| 10 | 89% | 99.5% NF$_3$; 0% N$_2$; 0.5% N$_2$O | 89% |
| COMP. G | 4% | 60% NF$_3$; 23% N$_2$; 17% N$_2$O | 2% |
| COMP. H | S.S. not achieved | N/A | None |
| COMP. I | N/A | N/A | None |
| 11 | 92% 89% with continuous NH$_3$ | >99% NF$_3$; 0% N$_2$; <1% N$_2$O; >99.5% NF$_3$ | 91% 89% |

TABLE II-continued

Product Information and Yield

| EX | STEADY STATE (S.S.) $F_2$ CONVERSION | PRODUCT GAS COMPOSITION | $NF_3$ YIELD |
|---|---|---|---|
| 12 | 90% | 98.7% $NF_3$; 0.6% $N_2$; 0.7% $N_2O$ | 89% |
| 13 | 91 | 98.5% $NF_3$; 1.2% $N_2$; 0.3% $N_2O$ | 90 |
|  | 92 after $NH_3$ addition | 96–98% $NF_3$; 1–2% $N_2$; <3% $N_2O$ | 90 |

While the invention has been described in detail and with reference to specific examples thereof, it will be apparent to one skilled in the art that various changes and modifications can be made therein without departing from the spirit and scope thereof.

We claim:

1. A method for producing a nitrogen trifluoride product, the method comprising:
   providing a reaction mixture comprising an ammonium ion source and a perfluorcarbon fluid wherein at least a portion of the ammonium ion source comprises a solid; and
   introducing a fluorine reactant to the reaction mixture at one or more temperatures sufficient to effect a reaction and thereby form the nitrogen trifluoride product.

2. The method of claim 1 further comprising the step of heating the reaction mixture to substantially solubilize at least a portion of the ammonium ion source within the perfluorocarbon fluid.

3. The method of claim 1 further comprising the step of introducing an ammonia gas into the reaction mixture.

4. The method of claim 3 wherein the reaction is performed in a continuous manner with the fluorine reactant and the ammonia gas added to the reaction mixture.

5. The method of claim 1 wherein the temperature ranges from about 60° C. to about 144° C.

6. The method of claim 5 wherein the temperature ranges from about 90° C. to about 120° C.

7. The method of claim 6 wherein the percentage yield of the nitrogen trifluoride product is about 80% or greater.

8. The method of claim 7 wherein the percentage yield of the nitrogen trifluoride product is about 90% or greater.

9. The method of claim 1 wherein the weight-to-volume ratio of the ammonium ion source to the perfluorocarbon fluid ranges from 4:1 to 1:2.

10. The method of claim 1 wherein the weight percentage of the ammonium ion source to the perfluorocarbon fluid in the reaction mixture ranges from 1% to 99 weight %.

11. The method of claim 1 wherein the ammonium ion source is at least one selected from the group consisting of $NH_3$, $NH_4F$, $NH_4HF_2$, $NH_4Cl$, $NH_4Br$, $NH_4I$, $NH_4NO_3$, $(NH_4)_3PO_4$, $(NH_4)_2SO_4$, $(NH_4)_2CO_3$, $NH_4HCO_3$, $NH_4HSO_4$, $NH_4OSO_2F$, $NH_4OSO_2Cl$, $NH_4OSO_2CF_3$, $NH_4OSO_2CH_3$, $NH_4OC(O)CF_3$, $NH_4OC(O)CH_3$, $NH_4N(SO_2CF_3)_2$, $NH_4OIOF_4$, $NH_4OTeF_5$, $NH_4IO_4$, $NH_4ClO_4$, $NH_4BrO_4$, and mixtures thereof.

12. The method of claim 11 wherein the ammonium ion source comprises ammonium fluoride.

13. The method of claim 11 wherein the ammonium ion source comprises ammonium bifluoride.

14. The method of claim 11 wherein the ammonium ion source comprises ammonia.

15. The method of claim 1 wherein the ammonium ion source comprises a compound of the formula $(NH_4)_yMF_z.nHF$ wherein M is one or more elements selected from the group consisting of elements of Group 1 through Group 18 of the Periodic Table of the Elements; y is a number that ranges from 1 to 4; z is a number that ranges from 2 to 8; and n is an amount that is sufficient to maintain the compound as a liquid in the exisiting reaction conditions.

16. The method of claim 1 wherein the ammonium ion source comprises a compound of the formula $(NH_4)_xM_y A.nHF$ wherein M is one or more elements selected from the group consisting of elements of Group 1 through 18 of the Periodic Table of the Elements; A is an anion selected from the group consisting of carbonate, bicarbonate, phosphate, sulfate, nitrate, periodate, perbromate, and perchlorate; x is a number that ranges from 1 to 3; y is a number that ranges from 0 to 2; and n is an amount that is sufficient to maintain the compound as a liquid in the reaction mixture.

17. The method of claim 1 wherein the ammonium ion source is a spent reaction mixture.

18. The method of claim 1 wherein the ammonium ion source is at least one selected from the group consisting of:
   a. $NH_3$, $NH_4F$, $NH_4HF_2$, $NH_4Cl$, $NH_4Br$, $NH_4I$, $NH_4NO_3$, $(NH_4)_3PO_4$, $(NH_4)_2SO_4$, $(NH_4)_2CO_3$, $NH_4HCO_3$, $NH_4HSO_4$, $NH_4OSO_2F$, $NH_4OSO_2Cl$, $NH_4OSO_2CF_3$, $NH_4OSO_2CH_3$, $NH_4OC(O)CF_3$, $NH_4OC(O)CH_3$, $NH_4N(SO_2CF_3)_2$, $NH_4OIOF_4$, $NH_4OTeF_5$, $NH_4IO_4$, $NH_4ClO_4$, $NH_4BrO_4$;
   b. a compound of the formula $(NH_4)_yMF_z.nHF$ wherein M is one or more elements selected from the group consisting of elements of Group 1 through Group 18 of the Periodic Table of the Elements; y is a number that ranges from 1 to 4; z is a number that ranges from 2 to 8; and n is an amount that is sufficient to maintain the compound as a liquid in the exisiting reaction conditions; or
   c. a compound of the formula $(NH_4)_xM_yA.nHF$ wherein M is one or more elements selected from the group consisting of elements of Group 1 through 18 of the Periodic Table of the Elements; A is an anion selected from the group consisting of carbonate, bicarbonate, phosphate, sulfate, nitrate, periodate, perbromate, and perchlorate; x is a number that ranges from 1 to 3; y is a number that ranges from 0 to 2; and n is an amount that is sufficient to maintain the compound as a liquid in the reaction mixture; and mixtures thereof.

19. The method of claim 1 wherein the reaction mixture is agitated.

20. The method of claim 1 wherein the fluorine reactant is introduced at a rate of 40 lbs per hour or greater.

21. A method for producing a nitrogen trifluoride product, the method comprising:

combining an ammonium ion source and a perfluorocarbon fluid to form a reaction mixture wherein at least a portion of the ammonium ion source comprises a solid;

heating the reaction mixture to substantially solubilize at least a portion of the ammonium ion source within the perfluorocarbon compound; and introducing a fluorine reactant to the reaction mixture at one or more temperatures sufficient to effect a reaction and thereby form the nitrogen trifluoride product.

22. The method of claim 21 further comprising the step of introducing an ammonia gas into the reaction mixture.

23. The method of claim 21 wherein the temperature ranges from about 60° C. to about 144° C.

24. The method of claim 23 wherein the temperature ranges from about 90° C. to about 120° C.

25. The method of claim 24 wherein the percentage yield of the nitrogen trifluoride product is about 80% or greater.

26. The method of claim 25 wherein the percentage yield of the nitrogen trifluoride product is about 90% or greater.

27. A method for producing a nitrogen trifluoride product at a high yield, the method comprising:

combining an ammonium ion source and a perfluorocarbon fluid to form a reaction mixture wherein the ammonium ion source comprises a solid;

heating the reaction mixture to substantially solubilize at least a portion of the ammonium ion source within the perfluorocarbon fluid; and introducing a fluorine reactant to the reaction mixture at one or more temperatures ranging from about 90° C. to about 120° C. to effect a reaction and thereby form the nitrogen trifluoride product wherein the percentage yield of the nitrogen trifluoride product is about 80% or greater.

28. The method of claim 27 further comprising the step of introducing an ammonia gas into the reaction mixture.

29. The method of claim 28 wherein the reaction is performed in a continuous manner with the fluorine reactant and an ammonia gas added to the reaction mixture.

30. The method of claim 27 wherein the reaction mixture is agitated.

31. The method of claim 27 wherein the fluorine reactant is introduced at a rate of 40 lbs per hour or greater.

* * * * *